(12) United States Patent
Narumanchi et al.

(10) Patent No.: US 12,719,863 B2
(45) Date of Patent: Aug. 25, 2026

(54) METHOD AND SYSTEM FOR BIOMETRIC SINGLE SIGN-ON AUTHENTICATION VIA HOMOMORPHIC HASH BASED MESSAGE AUTHENTICATION CODE

(71) Applicant: Tata Consultancy Services Limited, Mumbai (IN)

(72) Inventors: Harika Narumanchi, Hyderabad (IN); Lakshmi Padmaja Maddali, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 1 day.

(21) Appl. No.: 19/090,564

(22) Filed: Mar. 26, 2025

(65) Prior Publication Data

US 2025/0350596 A1 Nov. 13, 2025

(30) Foreign Application Priority Data

May 10, 2024 (IN) ............................. 202421037044

(51) Int. Cl.
*H04L 9/40* (2022.01)
*H04L 9/00* (2022.01)

(52) U.S. Cl.
CPC .......... *H04L 63/0861* (2013.01); *H04L 9/008* (2013.01)

(58) Field of Classification Search
CPC .................................................. H04L 63/0861
See application file for complete search history.

(56) References Cited

U.S. PATENT DOCUMENTS

2019/0278937 A1* 9/2019 Streit ...................... G06F 21/32
2020/0358611 A1* 11/2020 Hoang .................. G06N 3/045
(Continued)

OTHER PUBLICATIONS

Tandoh Lawrence et al.; “A bandwidth efficient HMAC-based authentication scheme for network coding”, Journal of Information Security and Applications, ScienceDirect, Elsevier Ltd., vol. 55, No. 102658, pp. 1-16, (2020).
(Continued)

*Primary Examiner* — Bradley W Holder
(74) *Attorney, Agent, or Firm* — Finnegan, Henderson, Farabow, Garrett & Dunner, LLP

(57) ABSTRACT

The present disclosure provides biometric single sign-on authentication via homomorphic hash based message authentication code (HMAC). Conventional methods fails to provide authentication without revealing biometric data. In the present disclosure, when the user initiates a service request, a service provider redirects to an identify provider for authentication. Further, user captures and encrypts his/her biometrics using homomorphic HMAC, creating ciphertext. User submits his/her encrypted biometrics to the identity provider for authentication. The identity provider uses template matching algorithms to compare the user submitted encrypted biometrics (fingerprint, iris) with stored templates. The identity provider then transmits authentication result and the corresponding proof of authentication. Further, the service provider re-computes the authentication tag based on the received decrypted authentication result and the secret nonce. Finally, the service provider provides the requested service to the client machine, only if the re-computed authentication tag matches with the associated decrypted proof.

6 Claims, 6 Drawing Sheets

(56) References Cited

U.S. PATENT DOCUMENTS

| | | | | |
|---|---|---|---|---|
| 2023/0403133 | A1* | 12/2023 | Vemury ................ | H04L 9/3231 |
| 2024/0313976 | A1* | 9/2024 | Shin ...................... | H04L 9/3242 |

OTHER PUBLICATIONS

Anuj Kumar; "A Novel Privacy Preserving HMAC Algorithm Based on Homomorphic Encryption and Auditing for Cloud", 2020 Fourth International Conference on I-SMAC (IoT in Social, Mobile, Analytics and Cloud) (I-SMAC), IEEE, pp. 198-202, (2020).

* cited by examiner

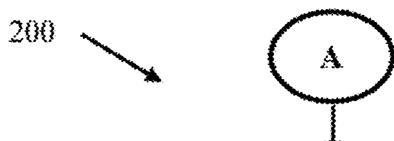

receiving, by the service provider, a decrypted authentication result and an associated decrypted proof from the client machine, wherein the decrypted authentication result and the associated decrypted proof are generated by the client machine based on an encrypted authentication result and an associated encrypted proof received from the identity provider, and wherein the encrypted authentication result is computed by the identity provider by: (i ) computing a similarity score by comparing the encrypted biometric data received from the client machine with a plurality of biometric templates associated with a plurality of users pre-captured and stored (ii) obtaining an encrypted authentication result by comparing the similarity score with a pre-defined encrypted threshold, wherein the encrypted authentication result is one of, (i) a match and (ii) a non-match and (iii) generating the associated encrypted proof for the encrypted authentication result, wherein the encrypted authentication result and the associated encrypted proof are transmitted to the client machine by the identity provider

208 re-compute by the service provider, an authentication tag based on the received decrypted authentication result and the secret nonce

210 provide service, by the service provider to the client machine, only if the re-computed authentication tag matches with the associated decrypted proof

METHOD AND SYSTEM FOR BIOMETRIC SINGLE SIGN-ON AUTHENTICATION VIA HOMOMORPHIC HASH BASED MESSAGE AUTHENTICATION CODE

PRIORITY CLAIM

The present application claims priority to Indian Application No. 202421037044, filed on May 10, 2024. The entire contents of the aforementioned application are incorporated herein by reference.

TECHNICAL FIELD

The disclosure herein generally relates to the field of cybersecurity and, more particularly, to a method and system for biometric single sign-on authentication via homomorphic hash based message authentication code.

BACKGROUND

Single Sign On (SSO) authentication is preferred nowadays over other authentication mechanisms to reduce password related security risks and to avoid phishing attacks. The SSO is an authentication scheme where users can securely authenticate and gain access to multiple applications and websites by only logging in with a single username and password. Hence SSO reduces the number of attack surfaces because user's login once each day and use one set of credentials. Reducing the number of login to one set of credentials improves security of organizations.

However, in conventional SSO methods, identity providers typically have full access to the user's biometric information, making them susceptible for attackers and potentially leading to privacy breaches or unauthorized sharing of biometrics. Further, in conventional methods, users often have limited control on how their biometric information is used, shared or processed. Even if the biometric information is stored in encrypted form using traditional encryption schemes, it still needs to be decrypted for user authentication. Current SSO systems require user's biometric information either in plain or in encrypted format for authentication. However, even if biometric are encrypted, they need to be decrypted at the identity provider side at some point to authenticate a user. This can lead to privacy concerns for the users as it exposes biometric information to the identity provider. Therefore, it is challenging to develop a technology solution that can perform SSO authentication without revealing biometric information.

SUMMARY

Embodiments of the present disclosure present technological improvements as solutions to one or more of the above-mentioned technical problems recognized by the inventors in conventional systems. For example, in one embodiment, a method for Biometric single sign-on authentication via homomorphic hash based message authentication code is provided. The method includes receiving, by one or more hardware processors of a service provider, a service request from a user associated with a client machine. Further, the method includes sending, by the one or more hardware processors of the service provider via an identity provider, an authentication request to the client machine for the service request, wherein the client machine performs (i) capturing a biometric data pertaining to the user using a biometric capturing device associated with the client machine, and (ii) generating an encrypted biometric data associated with the user based on the captured biometric data using a Fully data is transmitted to the identity provider for authentication. Furthermore, the method includes transmitting, by the one or more hardware processors of the service provider, a secure nonce to the identity provider, wherein the transmitted secure nonce is received by the identity provider post receiving the encrypted biometric data from the client machine. Furthermore, the method includes receiving, by the one or more hardware processors of the service provider, a decrypted authentication result and an associated decrypted proof from the client machine, wherein the decrypted authentication result and the associated decrypted proof are generated by the client machine based on an encrypted authentication result and an associated encrypted proof received from the identity provider, and wherein the encrypted authentication result is computed by the identity provider by: (i) computing a similarity score by comparing the encrypted biometric data with a plurality of biometric templates associated with a plurality of users pre captured and stored (ii) obtaining an encrypted authentication result by comparing the similarity score with a predefined encrypted threshold, wherein the encrypted authentication result is one of, (i) a match and (ii) a non-match and (iii) generating the associated encrypted proof for the encrypted authentication result, wherein the encrypted authentication result and the associated encrypted proof are transmitted to the client machine by the identity provider. Furthermore, the method includes, re-computing, by the one or more hardware processors of the service provider, an authentication tag based on the received decrypted authentication result and the secret nonce. Finally, the method includes providing service, by the one or more hardware processors of the service provider to the client machine, if the re-computed authentication tag matches with the associated decrypted proof.

In another aspect, a system for biometric single sign-on authentication via homomorphic hash based message authentication code is provided. The system includes a plurality of client machines, an identity provider and a service provider, wherein the service provider, the plurality of client machines and the identity provider comprises at least one memory storing programmed instructions; one or more Input/Output (I/O) interfaces; and one or more hardware processors of the service provider, the plurality of client machines and the identity provider are operatively coupled to a corresponding at least one memory, wherein the system is configured to receive, by a service provider, a service request from a user associated with a client machine. Further, the system is configured to send, by the service provider via an identity provider, an authentication request to the client machine for the service request, wherein the client machine performs (i) capturing a biometric data pertaining to the user using a biometric capturing device associated with the client machine, and (ii) generating an encrypted biometric data associated with the user based on the captured biometric data using a Fully Homomorphic Encryption (FHE) public key of the user, wherein the encrypted biometric data is transmitted to the identity provider for authentication. Furthermore, the system is configured to transmit, by the service provider, a secure nonce to the identity provider, wherein the transmitted secure nonce is received by the identity provider post receiving the encrypted biometric data from the client machine. Furthermore, the system is configured to receive, by the service provider, a decrypted authentication result and an associated decrypted proof from the client machine, wherein the decrypted authentication result and the associated decrypted proof are generated by the client machine based on an encrypted authentication result and an associated encrypted proof received from the identity provider, and wherein the encrypted authentication result is computed by the identity provider by: (i) computing a similarity score by comparing the encrypted biometric data with a plurality of biometric templates associated with a plurality of users pre captured and stored (ii) obtaining an encrypted authentication result by comparing the similarity score with a pre-defined encrypted threshold, wherein the encrypted authentication result is one of, (i) a match and (ii) a non-match and (iii) generating the associated encrypted proof for the encrypted authentication result, wherein the encrypted authentication result and the associated encrypted proof are transmitted to the client machine by the identity provider. Furthermore, the system is configured to re-compute, by service provider, an authentication tag based on the received decrypted authentication result and the secret nonce. Finally, the system is configured to provide service, by the service provider to the client machine, if the re-computed authentication tag matches with the associated decrypted proof.

In yet another aspect, one or more non-transitory machine-readable information storage mediums comprising one or more instructions is provided. The one or more instructions which when executed by one or more hardware processors cause to receive, by a service provider, a service request from a user associated with a client machine; send, by the service provider via an identity provider, an authentication request to the client machine for the service request, wherein the client machine performs (i) capturing a biometric data pertaining to the user using a biometric capturing device associated with the client machine, and (ii) generating an encrypted biometric data associated with the user based on the captured biometric data using a Fully data is transmitted to the identity provider for authentication; transmit, by the service provider, a secure nonce to the identity provider, wherein the transmitted secure nonce is received by the identity provider post receiving the encrypted biometric data from the client machine; receive, by the service provider, a decrypted authentication result and an associated decrypted proof from the client machine, wherein the decrypted authentication result and the associated decrypted proof are generated by the client machine based on an encrypted authentication result and an associated encrypted proof received from the identity provider, and wherein the encrypted authentication result is computed by the identity provider by: (i) computing a similarity score by comparing the encrypted biometric data with a plurality of biometric templates associated with a plurality of users pre captured and stored (ii) obtaining an encrypted authentication result by comparing the similarity score with a pre-defined encrypted threshold, wherein the encrypted authentication result is one of, (i) a match and (ii) a non-match and (iii) generating the associated encrypted proof for the encrypted authentication result, wherein the encrypted authentication result and the associated encrypted proof are transmitted to the client machine by the identity provider; re-compute, by service provider, an authentication tag based on the received decrypted authentication result and the secret nonce; and provide service, by the service provider to the client machine, if the re-computed authentication tag matches with the associated decrypted proof.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 2A and 2B are exemplary flow diagrams for the method for biometric single sign-on authentication via homomorphic HMAC implemented by the system of FIG. 1A, in accordance with some embodiments of the present disclosure.

DETAILED DESCRIPTION

Figure 1A:
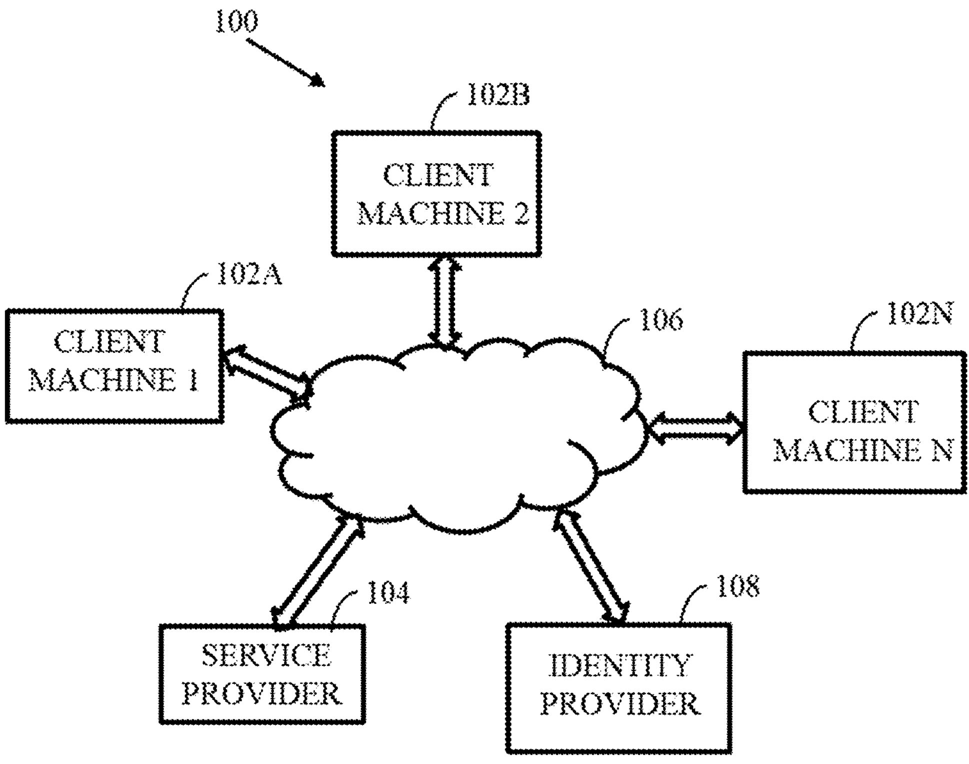
FIG. 1A is a functional block diagram of a system for biometric single sign-on authentication via homomorphic Hash based Message Authentication Code (HMAC), according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Hash-based Message Authentication Code (HMAC) is a result of work done on developing a MAC derived from cryptographic hash functions. HMAC has great resistance towards cryptanalysis attacks as it uses the hashing concept twice. HMAC consists of twin benefits of Hashing and MAC and thus is more secure than any other authentication code.

Homomorphism property preserves new secure method to perform a group of operations on ciphertexts in untrusted third party without knowledge of any secret information. The ability to perform simple computation on ciphertexts leads to a lot of applications and security protocols, but the complicated structure of homomorphic cryptosystems limits applicability in some protocols that need fast computation.

Conventional Biometric-Single Sign On (B-SSO) user authentication workflow has two phases named enrollment phase and authentication phase. In enrollment workflow, a biometric device captures the user's biometric data (e.g. fingerprints, iris) and extracts specific features from it. The template associated with the user is then stored in a database or secure location at identity provider. In the authentication workflow, the system extracts feature from the newly captured biometric data in a similar manner to the enrollment phase. The template created from the extracted features of the current biometric is compared with the template stored during enrollment. This is typically done using matching algorithms like similarity score, or decision based techniques. If the similarity score exceeds a predefined threshold or falls within an acceptable range, the authentication is considered successful, and the user is granted access. Otherwise, authentication fails.

In the said conventional SSO methods, the identity provider has full access to the user's biometric information and the user has limited control on how his biometric information is used, shared or processed. Even though the biometric information is stored in encrypted form using traditional encryption schemes, biometrics need to be decrypted to authenticate a user. Once biometric information is compromised, it is not possible for users to revoke or change their biometric credentials, unlike passwords or tokens that can be easily reset.

To overcome the challenges of the conventional approaches, embodiments herein provide a method and system for biometric single sign-on authentication via homomorphic HMAC. The present disclosure helps in authenticating user without revealing the biometric information to a third-party identity provider. This is done by encrypting the biometric information and leveraging homomorphic Hash based Message Authentication Code (HMAC) to authenticate user without decrypting biometric information. The proposed invention provides a protocol for biometric authentication in SSO using homomorphic HMAC.

The present disclosure proposes a construction that can authenticate a user without revealing his/her biometric information to the identity provider. This is done by encrypting the biometric information and leveraging homomorphic HMAC for trusted decryption. The present disclosure eliminates the need for (i) device binding of private keys on user-side as needed in passkeys, and (ii) storing un-encrypted biometric templates at the identity provider as needed in current B-SSO systems.

Fully Homomorphic Encryption (FHE), considered as holy grail of cryptography, enables computations on encrypted data without the need for decryption, thereby preserving privacy of the data. For a set of FHE ciphertexts corresponding to a set of plaintexts, any arbitrary function can be evaluated without revealing the plaintexts. FHE supports addition and multiplication as primitive operations as shown in equations (1) and (2).

$$Enc(a+b) = Enc(a) + Enc(b) \tag{1}$$

$$Enc(a*b) = Enc(a) * Enc(b) \tag{2}$$

A public key FHE scheme & consists of an additional $Eval_\xi$ along with the usual ($KeyGen_\xi$, $Enc_\xi$, $Dec_\xi$) from any other public key scheme. $Eval_\xi$ is the evaluation algorithm used for computations on encrypted data. This algorithm takes as input a polynomial expression P and a set of ciphertexts $c=\{C_0, C_1, \ldots, C_n\}$ as inputs to P.

The input output of $Eval_\xi$ satisfies following equation (3):

$$Dec_\zeta(Eval_\zeta(P, c, pk), sk) = P(Dec_\zeta(c, sk)) \tag{3}$$

To improve the efficiency of homomorphic operations and to reduce space complexity, one can leverage homomorphic batching technique where multiple plaintexts are batched into a single ciphertext. On this batched ciphertext, operations can be performed on component wise plaintexts and can be executed in parallel in Single Instruction Multiple Data (SIMD) manner.

Homomorphic HMAC: In scenarios where user outsources its computations to the server, and it should know only about the result of the computation but not the inputs. For server, to know the result, it should send the encrypted result back to the user for decryption. However, there is no guarantee that the user is sending the correct decrypted result back to the server. Trusted decryption primitive ensures the proof of correctness of the decrypted result sent by the user. The trusted decryption workflow is as follows:

1. Outsource Computation: User outsources a computation $f(x)$ to a server.
2. Encrypt inputs: User encrypts inputs ip using FHE public key to get $E_{pk_i}(ip)$.
3. Transfer inputs: User transmits encrypted inputs $E_{pk_i}(ip)$ to server.
4. Compute: Server computes a function $f$ on encrypt inputs: $f(E_{pk_i}(ip))$ to get $E_{pk_i}(result)$.
5. Compute Proof: Server uses a secret nonce N to compute proof of result using homomorphic HMAC as follows:

$$E_{pk_i}(\text{tag}) = \text{Hom\_HMAC}(E_{pk_i}(\text{results}), E_{pk_i}(N)) \tag{4}$$

6. Forward Result: Server forwards $E_{pk_i}(result)$ and $E_{pk_i}(tag)$ to user.
7. Decrypt Result and Proof: User decrypts the $E_{pk_i}(result)$ and $E_{pk_i}(tag)$ using ski to get result and tag. Here, tag acts as a trusted decryption and ensures that user has not tampered with the result.
8. Send Decrypted Result and Proof: User sends result and tag to the server.
9. Proof of Decrypted Result: Server re-computes tag using the result sent by the user and secret nonce N using $$\text{tag}_v = HMAC(\text{results}, N) \tag{5}$$

$tag_v$ is compared with tag shared by the user. If comparison is successful, server confirms that result has not been tampered by the user.

Referring now to the drawings, and more particularly to FIGS. 1A through 3, where similar reference characters denote corresponding features consistently throughout the figures, there are shown preferred embodiments, and these embodiments are described in the context of the following exemplary system and/or method.

FIG. 1A is a functional block diagram of a system 100 for the biometric single sign-on authentication via homomorphic HMAC, according to some embodiments of the present disclosure. The system 100 includes a plurality of client machines 102A, 102B through 102N, a service provider 104, a network 106, and an identity provider 108. The plurality of client machines 102A through 102N, the service provider 104 and the identity provider 108 are connected by the network 106.

In an embodiment, the network 106 can be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, network 106 may include a variety of network devices, including routers, bridges, servers, computing devices, storage devices. The network devices within network 106 may interact with the system 102 through communication links.

Figure 1B:
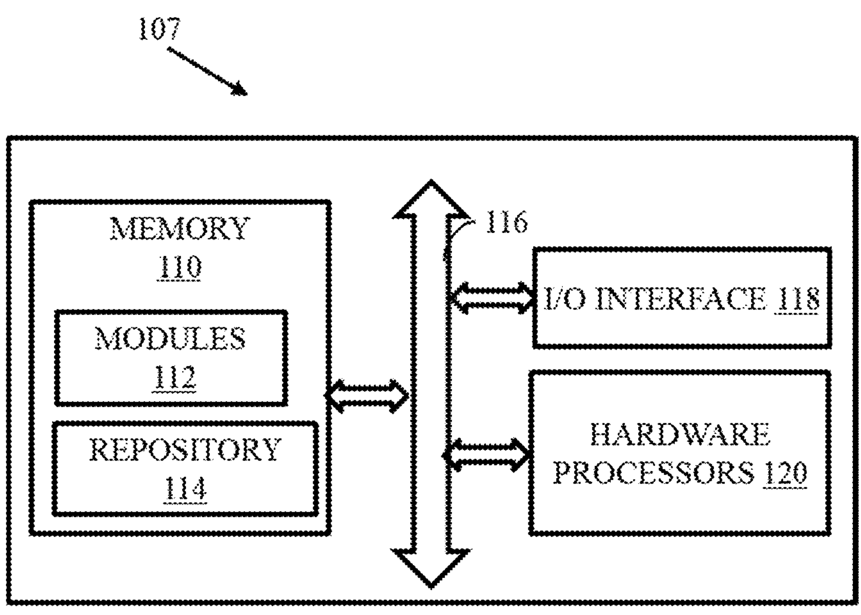
FIG. 1B is a functional block diagram of a computing device associated with the system of FIG. 1A, according to some embodiments of the present disclosure.

In an embodiment, the plurality of client machines 102A through 102N, the service provider 104, and the identity provider 108 may be implemented in a computing device as shown in FIG. 1B. The plurality of client machine 102A through 102N, the service provider 104, and the identity provider 108 can be a hand-held device, a laptop or other portable computer, a tablet computer, a mobile phone, a PDA, a smartphone, and a desktop computer. The client machine 102 and the proxy server machine 104 may also be implemented in a workstation, a mainframe computer, a server, and a network server.

FIG. 1B is a functional block diagram of computing device 107 associated with the system of FIG. 1A implementing the service provider 104/the identity provider 108/the client machine 102, according to some embodiments of the present disclosure. The computing device 107 is otherwise in communication with hardware processors 120, at least one memory such as a memory 110, an I/O interface 118. The hardware processors 120, memory 110, and the Input/Output (I/O) interface 118 may be coupled by a system bus such as a system bus 116 or a similar mechanism. In an embodiment, the hardware processors 120 can be one or more hardware processors.

The I/O interface 118 may include a variety of software and hardware interfaces, for example, a web interface, a graphical user interface, and the like. The I/O interface 118 may include a variety of software and hardware interfaces, for example, interfaces for peripheral device(s), such as a keyboard, a mouse, an external memory, a printer and the like. Further, interface 118 may enable the server machine 104 to communicate with other devices, such the client machine 102 via the network 106, web servers and external databases and the like.

The I/O interface 118 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 118 may include one or more ports for connecting a number of computing systems with one another or to another server computer. The I/O interface 118 may include one or more ports for connecting a number of devices to one another or to another server.

The one or more hardware processors 120 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 120 is configured to fetch and execute computer-readable instructions stored in memory 110.

The memory 110 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, memory 110 includes a plurality of modules 112. Memory 110 also includes a data repository 114 for storing data processed, received, and generated by the plurality of modules 112.

The plurality of modules 112 include programs or coded instructions that supplement applications or functions performed by the server machine 104 for the homomorphic HMAC scheme. The plurality of modules 112, amongst other things, can include routines, programs, objects, components, and data structures, which performs particular tasks or implement particular abstract data types. The plurality of modules 112 may also be used as, signal processor(s), state machine(s), logic circuitries, and/or any other device or component that manipulates signals based on operational instructions. Further, the plurality of modules 112 can be used by hardware, by computer-readable instructions executed by the one or more hardware processors 120, or by a combination thereof. The plurality of modules 112 can include various sub-modules (not shown). The plurality of modules 112 may include computer-readable instructions that supplement applications or functions performed by the system 100 for the homomorphic HMAC scheme.

The data repository 114 may include a plurality of abstracted pieces of code for refinement and data that is processed, received, or generated as a result of the execution of the plurality of modules in module(s) 112.

Although the data repository 114 is shown internal to the system 100, it will be noted that, in alternate embodiments, the data repository 114 can also be implemented external to the system 100, where the data repository 114 may be stored within a database (not shown in FIG. 1) communicatively coupled to the system 100. The data contained within such an external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS).

As understood by ordinary person skilled in the art, the client machines 102A through 102N has functional components similar to functional components of the service provider 104 and the identity provide 108 as depicted by computing device 107 in FIG. 2 and not repeated herein for brevity. The components perform functions in accordance with instructions stored in the memory block of the client device enabling the client device to communicate with server 104.

Figure 2A:
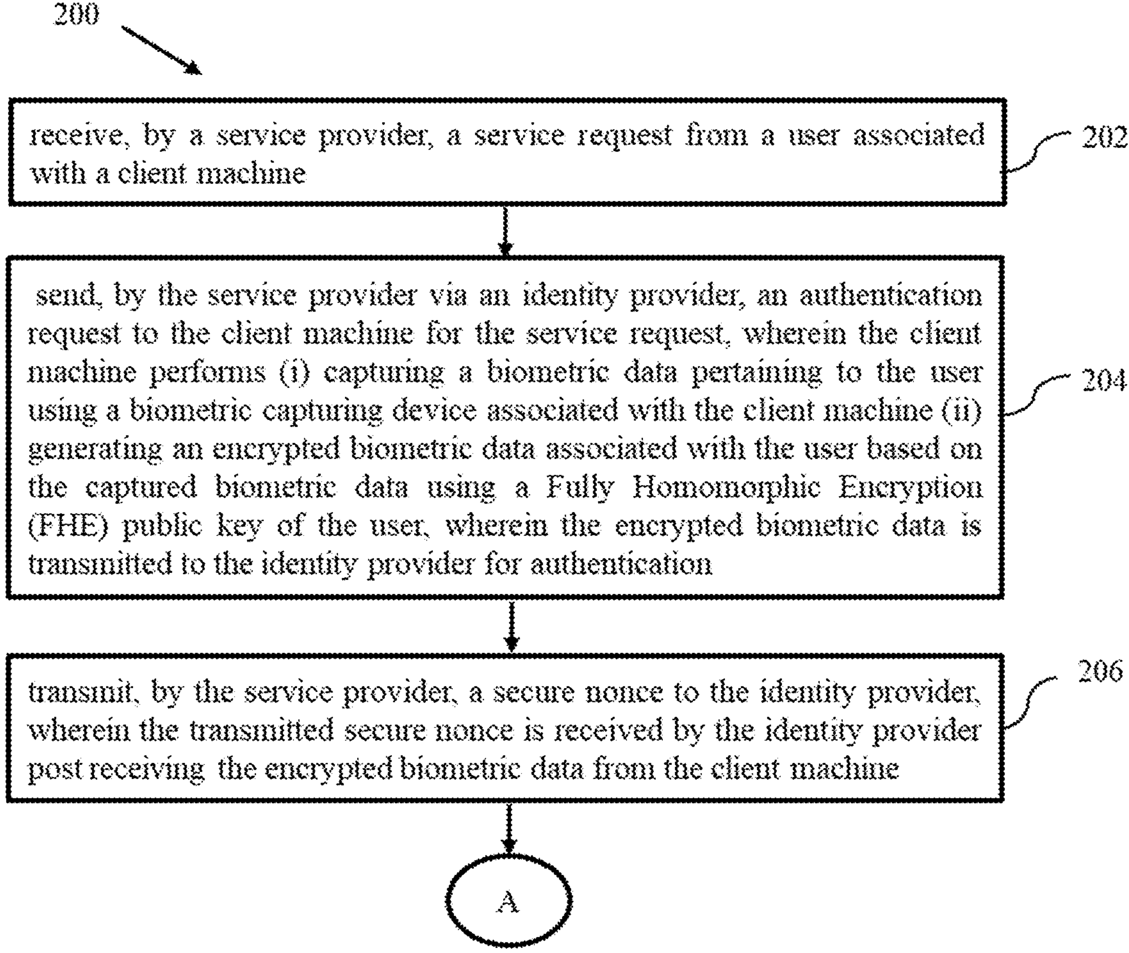

FIGS. 2A and 2B are exemplary flow diagrams for a processor implemented method for the biometric single sign-on authentication via homomorphic HMAC implemented by the system of FIG. 1A and FIG. 1B according to some embodiments of the present disclosure. In an embodiment, the computing device 107, implementing the server 104, comprises one or more data storage devices or the memory 110 operatively coupled to the one or more hardware processor(s) 120 and is configured to store instructions for execution of steps of the method 200 by the one or more hardware processors 120. The steps of method 200 of the present disclosure will now be explained with reference to the components or blocks of the system 107 as depicted in FIG. 1B and the steps of flow diagram as depicted in FIG. 2A and FIG. 2B. The method 200 may be described in the general context of computer executable instructions. Generally, computer executable instructions can include routines, programs, objects, components, data structures, procedures, modules, functions, etc., that perform particular functions or implement particular abstract data types. Method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

Entities of the present disclosure include User/Client machine, Service Provider (SP) 104 and Identity provider 108 (IdP).

Key Generation: Each entity owns a FHE public and private key pair (pk, sk), for example user A has public and private key pair ($pk_A$, $sk_A$).

At step 202 of method 200, the one or more hardware processors of the service provider 104 receives a service request from a user associated with a client machine. For example, the service request can be any web service requests.

At step 204 of the method 200, the one or more hardware processors of the service provider 104 sends via the identity provider, an authentication request to the client machine 102 for the service request. The client machine 102 performs (i) capturing a biometric data pertaining to the user using a biometric capturing device associated with the client machine 102 and (ii) generating an encrypted biometric data associated with the user based on the captured biometric data using the FHE public key of the user, wherein the encrypted biometric data is transmitted to the identity provider 108 for authentication. For example, user i encrypts $ip_i$ using FHE publickey $pk_i$ to get $E_{pk_i}(ip_i)$ and transmits $E_{pk_i}(ip_i)$.

For example, the technique for capturing biometric data is explained below. User captures his/her fingerprint using biometric reader. Fingerprint is captured with simulated data points representing the fingerprint's characteristics. An example fingerprint characteristics is given as [1, 0, 1, 1 . . . 1, 0, 1]. Further, minutiae points and ridge patterns are extracted from the fingerprint characteristics. An example set of minutiae points is given as [5, 4, 9, 32, 96, 12, 55, 7, 69, 36] and example ridge pattern is given as ['A', ‘A’, ‘A’, ‘A’, ‘C’, ‘C’, ‘A’, ‘B’, ‘C’, ‘B’, ‘A’, ‘C’, ‘C’, ‘C’, ‘C’, ‘C’, ‘C’, ‘C’, ‘B’, ‘B’, ‘C’, ‘C’, ‘B’, ‘B’, ‘C’, ‘B’, ‘B’, ‘A’, ‘C’, ‘B’, ‘A’, ‘B’, ‘B’, ‘C’, ‘A’, ‘B’, ‘C’, ‘A’, ‘B’, ‘A’, ‘C’, ‘B’, ‘B’, ‘A’, ‘C’, ‘A’, ‘A’, ‘B’, ‘C’, ‘B’, ‘B’, ‘A’, ‘A’, ‘B’, ‘C’, ‘B’, ‘B’, ‘C’, ‘A’, ‘C’, ‘C’, ‘B’, ‘C’, ‘B’, ‘A’, ‘C’, ‘B’, ‘A’, ‘B’, ‘B’, ‘B’, ‘C’, ‘A’, ‘B’, ‘B’, ‘C’, ‘C’, ‘A’, ‘B’, ‘B’, ‘C’, ‘B’, ‘C’, ‘A’, ‘C’, ‘B’, ‘C’, ‘B’, ‘C’, ‘C’, ‘A’, ‘B’, ‘A’, ‘A’, ‘C’, ‘C’, ‘A’, ‘B’, ‘B’, ‘A’]. Further, the extracted features (minutiae points and ridge patterns) are encoded into a sequence of 1s and 0s as given below.

$$\text{template1} = 00010100010001010000100010011100001010000000000110100011\ 0010001100011101000011001010100101000010000000001011 0100 \quad (6)$$

The above encoded template 1 is further encrypted using FHE public key to get $E_{pk_i}(ip_i)$. The encrypted biometric data is transmitted to the identity provider 108 for authentication.

$$E_{pk_i}(ip_i) = E(0001010001000101000010001001110000101000000000011010001\ 100100011000111010000110010101001010000100000000010110100) \quad (7)$$

At step 206 of the method 200, the one or more hardware processors of the service provider 104 transmits a secure nonce to the identity provider, wherein the transmitted secure nonce is received by the identity provider 108 post receiving the encrypted biometric data from the client machine. For example, the secure nonce is “1023”.

At step 208 of the method 200, the one or more hardware processors of the service provider 104 receives a decrypted authentication result and an associated decrypted proof from the client machine, wherein the decrypted authentication result and the associated decrypted proof is generated by the client machine 102 based on an encrypted authentication result and an associated encrypted proof received from the identity provider.

The steps for computing the encrypted authentication result by the identity provider 108 is explained as follows: Initially a similarity score is computed by comparing the encrypted biometric data with a plurality of biometric templates associated with a plurality of users captured and stored initially.

For example, the plurality of biometric templates are generated during the biometric enrollment workflow (shown in FIG. 3A): The biometric enrollment includes the following steps.

1. Capture Biometric: The biometric reader on user's side, captures biometric data.
2. Create Template: A biometric template is created from the captured biometric data for a user say user i, with features such as minutiae points, core and delta points, ridge shapes or patterns and so on. This biometric template is converted to a fixed length binary string fi using spectral minutiae representation, a mathematical transformation applied to analyze the spatial relationships between the minutiae points.
3. Encrypt Template: fi is encrypted using FHE public key of user i to get $E_{pk_i}(f_i)$.
4. Transfer Template: User sends $E_{pk_i}(f_i)$ to the identity provider.
5. Store Template: Identity provider 108 stores $E_{pk_i}(f_i)$ in a database.

The matching module on identity provider's side compares the input biometric $E_{pk_i}(ip_i)$ against the stored biometric $E_{pk_i}(f_i)$ to produce a similarity score $E_{pk_i}(s_i)$, which is then compared to a encrypted threshold $E_{pk_i}(t)$ to produce match or non-match decision (authentication result) $E_{pk_i}$(result) which can be either $E_{pk_i}(0)/E_{pk_i}(1)$.

Further, the associated encrypted proof is generated for the encrypted authentication result $E_{pk_i}$(result) as shown in equation (8) and an example is shown in equation (9), wherein the encrypted authentication result and the associated encrypted proof are transmitted to the client machine 102 by the identity provider 108.

$$E_{pk_i}(\text{tag}) = Hom\ HMAC(E_{pk_i}(\text{results}), E_{pk_i}(N)). \quad (8)$$

$$E_{pk_i}(\text{tag}) = \text{Hom\_HMAC}(E_{pk_i}(\text{results}, E(1023) = \quad (9)$$

-continued $$E(e011afc3b75cd6600c2362f1e2d46e53cb1bfe28)$$

At step 210 of the method 200, the one or more hardware processors of the service provider 104 re-computes, an authentication tag based on the received decrypted authentication result and the secret nonce as given in equation (10) an a corresponding example is given in equation (11).

$$tag_v = HMAC(\text{results}, N) \tag{10}$$

$$tag1 = HMAC(1, 1023) = e011afc3b75cd6600c2362f1e2d46e53cb1bfe28 \tag{11}$$

At step 212 of the method 200, the one or more hardware processors of the service provider 104 provides service to the client machine, provides service, only if the re-computed authentication tag matches with the associated decrypted proof. For example, tag1 is compared with tag to get:

$$(e011afc3b75cd6600c2362f1e2d46e53cb1bfe28 == e011afc3b75cd6600c2362f1e2d46e53cb1bfe28) = 1 \text{ (authentication success)}.$$

Since, comparison result is 1, the user is granted access to the requested service. If comparison result is 0, the user is denied access to the requested service.

Figure 3A:
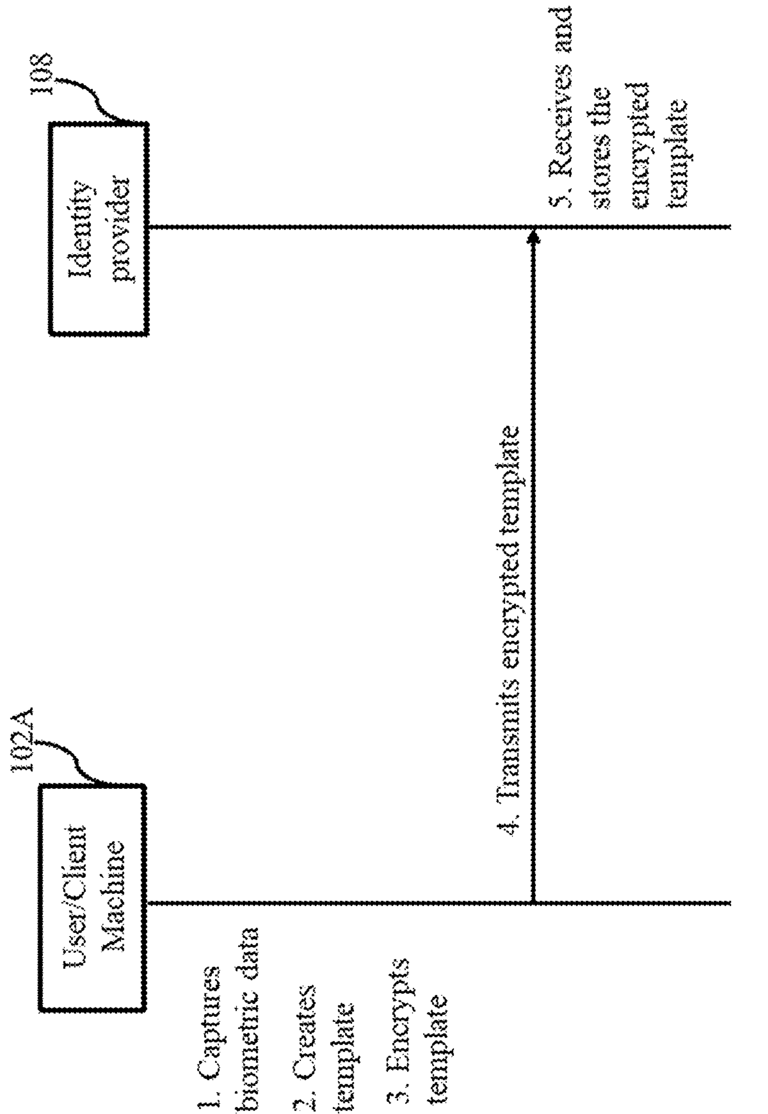
FIG. 3A illustrates an activity diagram for biometric registration for a method for biometric single sign-on authentication via homomorphic HMAC implemented by the system of FIG. 1A, according to some embodiments of the present disclosure.
Figure 3B:
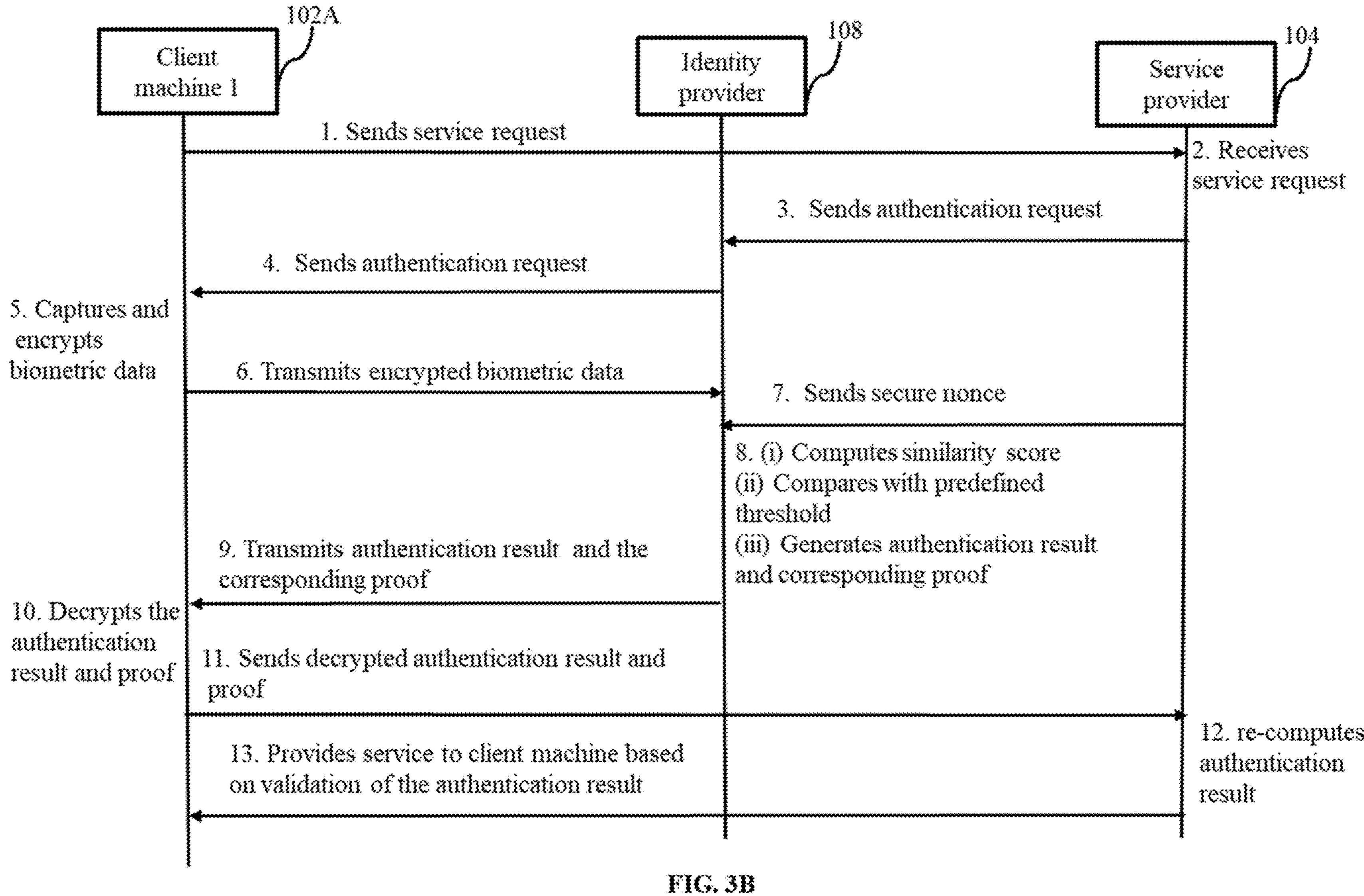
FIG. 3B illustrates an activity diagram illustrating the method for the biometric single sign-on authentication via homomorphic HMAC, in accordance with some embodiments of the present disclosure.

FIG. 3B illustrates an activity diagram illustrating the method for the biometric single sign-on authentication via homomorphic HMAC, in accordance with some embodiments of the present disclosure. Now referring to FIG. 3B, when the user initiates an authentication request to access an application or service provided by the service provider, the service provider 104 redirects to identity provider. If the user is not already authenticated, the service provider 104 redirects the user to the identity provider 108 for authentication. Further, user captures and encrypts his/her biometrics using homomorphic HMAC, creates ciphertext. User submits his/her encrypted biometrics to the identity provider 108 for authentication. The identity provider 108 uses template matching algorithms to compare the user submitted encrypted biometrics (fingerprint, iris) with stored templates. The identity provider 108 then transmits authentication result and the corresponding proof of authentication to the client machine 102. The client machine 102 decrypts the authentication result and proof and transmits it to the service provider 104. Further, the service provider 104 re-computes the authentication tag based on the received decrypted authentication result and the secret nonce. Finally, the service provider 104 provides the requested service to the client machine 102, only if the re-computed authentication tag matches with the associated decrypted proof.

Some of the compelling use cases of the present disclosure are as follows: (i) Biometric wearables such as smartwatches or fitness bands that can capture biometric data for authentication purposes (ii) IoT devices, such as smart locks or connected vehicles, can utilize biometric authentication to ensure secure access (iii) Healthcare industry can utilize biometric authentication to secure and efficient access to patient records and healthcare systems. Using biometric SSO healthcare providers can enable quick and secure authentication for accessing electronic health records (EHR) systems, medication administration platforms, and other healthcare applications. This ensures that patient biometric information remains confidential and (iv) Government applications: Government utilizes biometric authentication in border control systems, law enforcement applications, and various government portals.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of biometric single sign-on authentication via homomorphic hash based message authentication code. The present disclosure can authenticate a user without revealing his/her biometric information to a third-party identity provider. This is obtained by encrypted biometrics leverage FHE for encrypting biometric data stored at identity provider. Further, verification using encrypted biometrics leverage FHE for biometric template comparison and matching at identity provider 108 directly using encrypted data—authentication result is also in encrypted form. Finally, trusted decryption leverages Homomorphic HMAC based on FHE for enhanced trust in the decrypted authentication result provided by the user.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor (s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:

receiving, by one or more hardware processors of a service provider, a service request from a user associated with a client machine;

sending, by the one or more hardware processors of the service provider via an identity provider, an authentication request to the client machine for the service request, wherein the client machine performs (i) capturing a biometric data pertaining to the user using a biometric capturing device associated with the client machine, and (ii) generating an encrypted biometric data associated with the user based on the captured biometric data using a Fully Homomorphic Encryption (FHE) public key of the user, wherein the encrypted biometric data is transmitted to the identity provider for authentication;

transmitting, by the one or more hardware processors of the service provider, a secure nonce to the identity provider, wherein the transmitted secure nonce is received by the identity provider post receiving the encrypted biometric data from the client machine;

receiving, by the one or more hardware processors of the service provider, a decrypted authentication result and an associated decrypted proof from the client machine, wherein the decrypted authentication result and the associated decrypted proof are generated by the client machine based on an encrypted authentication result and an associated encrypted proof received from the identity provider, and wherein the encrypted authentication result is computed by the identity provider by:

computing a similarity score by comparing the encrypted biometric data with a plurality of biometric templates associated with a plurality of users pre captured and stored;

obtaining an encrypted authentication result by comparing the similarity score with a pre-defined encrypted threshold, wherein the encrypted authentication result is one of, (i) a match and (ii) a non-match; and generating the associated encrypted proof for the encrypted authentication result, wherein the encrypted authentication result and the associated encrypted proof are transmitted to the client machine by the identity provider;

re-computing, by the one or more hardware processors of the service provider, an authentication tag based on the received decrypted authentication result and the secret nonce; and providing service, by the one or more hardware processors of the service provider to the client machine, if the re-computed authentication tag matches with the associated decrypted proof.

2. The method of claim 1, wherein generating the encrypted biometric data associated with the user based on the captured biometric data using the FHE public key of the user comprises:

generating a biometric template pertaining to the user comprising a plurality of biometric features based on the captured biometric data, wherein the plurality of biometric features comprises a plurality of minutiae points, a plurality of core points, a plurality of delta points and a plurality of ridge shapes;

generating a biometric string pertaining to the user by converting the biometric template associated with the user into a fixed length binary string using spectral minutiae transformation technique; and encrypting the biometric string using the FHE public key of the user to obtain the encrypted biometric data.

3. A system comprising:

A plurality of client machines, an identity provider and a service provider, wherein the service provider, the plurality of client machines and the identity provider comprises at least one memory storing programmed instructions; one or more Input/Output (I/O) interfaces; and one or more hardware processors of the service provider, the plurality of client machines and the identity provider are operatively coupled to a corresponding at least one memory, wherein the system is configured to:

receive, by the service provider, a service request from a user associated with a client machine of the plurality of client machines;

send, by the service provider via the identity provider, an authentication request to the client machine for the service request, wherein the client machine performs (i) capturing a biometric data pertaining to the user using a biometric capturing device associated with the client machine, and (ii) generating an encrypted biometric data associated with the user based on the captured biometric data using a Fully Homomorphic Encryption (FHE) public key of the user, wherein the encrypted biometric data is transmitted to the identity provider for authentication;

transmit, by the service provider, a secure nonce to the identity provider, wherein the transmitted secure nonce is received by the identity provider post receiving the encrypted biometric data from the client machine;

receive, by the service provider, a decrypted authentication result and an associated decrypted proof from the client machine, wherein the decrypted authentication result and the associated decrypted proof are generated by the client machine based on an encrypted authentication result and an associated encrypted proof received from the identity provider, and wherein the encrypted authentication result is computed by the identity provider by:

computing a similarity score by comparing the encrypted biometric data with a plurality of biometric templates associated with a plurality of users pre captured and stored;

obtaining an encrypted authentication result by comparing the similarity score with a pre-defined encrypted threshold, wherein the encrypted authentication result is one of, (i) a match and (ii) a non-match; and generating the associated encrypted proof for the encrypted authentication result, wherein the encrypted authentication result and the associated encrypted proof are transmitted to the client machine by the identity provider;

re-compute, by the service provider, an authentication tag based on the received decrypted authentication result and the secret nonce; and provide service, by the service provider to the client machine, if the re-computed authentication tag matches with the associated decrypted proof.

4. The system of claim 3, wherein generating the encrypted biometric data associated with the user based on the captured biometric data using the FHE public key of the user comprises:

generating a biometric template pertaining to the user comprising a plurality of biometric features based on the captured biometric data, wherein the plurality of biometric features comprises a plurality of minutiae points, a plurality of core points, a plurality of delta points and a plurality of ridge shapes;

generating a biometric string pertaining to the user by converting the biometric template associated with the user into a fixed length binary string using a spectral minutiae transformation technique; and encrypting the biometric string using the FHE public key of the user to obtain the encrypted biometric data.

5. One or more non-transitory machine-readable information storage mediums comprising one or more instructions which when executed by one or more hardware processors cause:

receiving a service request from a user associated with a client machine;

sending an authentication request to the client machine for the service request, wherein the client machine performs (i) capturing a biometric data pertaining to the user using a biometric capturing device associated with the client machine, and (ii) generating an encrypted biometric data associated with the user based on the captured biometric data using a Fully Homomorphic Encryption (FHE) public key of the user, wherein the encrypted biometric data is transmitted to the identity provider for authentication;

transmitting a secure nonce to the identity provider, wherein the transmitted secure nonce is received by the identity provider post receiving the encrypted biometric data from the client machine;

receiving a decrypted authentication result and an associated decrypted proof from the client machine, wherein the decrypted authentication result and the associated decrypted proof are generated by the client machine based on an encrypted authentication result and an associated encrypted proof received from the identity provider, and wherein the encrypted authentication result is computed by the identity provider by:

computing a similarity score by comparing the encrypted biometric data with a plurality of biometric templates associated with a plurality of users pre captured and stored;

obtaining an encrypted authentication result by comparing the similarity score with a pre-defined encrypted threshold, wherein the encrypted authentication result is one of, (i) a match and (ii) a non-match; and generating the associated encrypted proof for the encrypted authentication result, wherein the encrypted authentication result and the associated encrypted proof are transmitted to the client machine by the identity provider;

re-computing an authentication tag based on the received decrypted authentication result and the secret nonce; and providing service to the client machine, if the re-computed authentication tag matches with the associated decrypted proof.

6. The one or more non-transitory machine-readable information storage mediums of claim 5, wherein the one or more instructions cause the one or more hardware processors to:

generate the encrypted biometric data associated with the user based on the captured biometric data using the FHE public key of the user comprises:

generate a biometric template pertaining to the user comprising a plurality of biometric features based on the captured biometric data, wherein the plurality of biometric features comprises a plurality of minutiae points, a plurality of core points, a plurality of delta points and a plurality of ridge shapes;

generate a biometric string pertaining to the user by converting the biometric template associated with the user into a fixed length binary string using a spectral minutiae transformation technique; and encrypt the biometric string using the FHE public key of the user to obtain the encrypted biometric data.

* * * * *